(12) United States Patent
Moravec et al.

(10) Patent No.: US 9,922,451 B2
(45) Date of Patent: Mar. 20, 2018

(54) THREE-DIMENSIONAL IMAGE PROCESSING APPARATUS AND THREE-DIMENSIONAL IMAGE PROCESSING SYSTEM

(71) Applicant: SEIKO EPSON CORPORATION, Tokyo (JP)

(72) Inventors: Ivo Moravec, Richmond Hill (CA); Michael Joseph Mannion, Newmarket (CA)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 15/041,341

(22) Filed: Feb. 11, 2016

(65) Prior Publication Data

US 2016/0260244 A1    Sep. 8, 2016

(30) Foreign Application Priority Data

Mar. 5, 2015    (JP) ................................ 2015-043268

(51) Int. Cl.
*G06T 15/50*    (2011.01)
*G06T 15/20*    (2011.01)

(52) U.S. Cl.
CPC .......... *G06T 15/506* (2013.01); *G06T 15/205* (2013.01); *G06T 15/50* (2013.01); *G06T 2207/10028* (2013.01); *G06T 2215/16* (2013.01)

(58) Field of Classification Search
CPC ..... G06T 15/506; G06T 15/205; G06T 15/50; G06T 2207/10028; G06T 2215/16
See application file for complete search history.

(56) References Cited

U.S. PATENT DOCUMENTS

| | | | |
|---|---|---|---|
| 2002/0186314 A1* | 12/2002 | Debevec ................ | G03B 15/02 348/371 |
| 2006/0210146 A1* | 9/2006 | Gu ......................... | G01B 11/25 382/154 |
| 2008/0118143 A1* | 5/2008 | Gordon .............. | G01B 11/2513 382/154 |
| 2016/0150217 A1* | 5/2016 | Popov .................... | G06T 15/04 348/48 |

FOREIGN PATENT DOCUMENTS

JP        2011-149952 A    8/2011

\* cited by examiner

*Primary Examiner* — Robert Craddock
(74) *Attorney, Agent, or Firm* — Global IP Counselors, LLP (57) ABSTRACT

A three-dimensional image processing apparatus includes: an obtainment unit that obtains range image data from each of a plurality of range image generation devices and obtains visible light image data from each of a plurality of visible light image generation devices; a model generation unit that generates three-dimensional model data expressing a target contained in a scene based on a plurality of pieces of the range image data; a setting unit that sets a point of view for the scene; and a rendering unit that selects one of the pieces of the visible light image data in accordance with the set point of view and renders a region corresponding to the surface of the target based on the selected visible light image data.

8 Claims, 5 Drawing Sheets

THREE-DIMENSIONAL IMAGE PROCESSING APPARATUS AND THREE-DIMENSIONAL IMAGE PROCESSING SYSTEM

CROSS REFERENCE TO RELATED APPLICATION

This application claims priority to Japanese Application No. 2015-043268, filed Mar. 5, 2015, the entirety of which is incorporated by reference herein.

BACKGROUND

1. Technical Field

The present invention relates to three-dimensional image processing apparatuses, three-dimensional image processing systems, and three-dimensional image processing methods.

2. Related Art

A three-dimensional image processing apparatus that changes a displayed image in accordance with a set point of view has been known for some time. This three-dimensional image processing apparatus captures a scene from a plurality of image capture points, generates a single piece of three-dimensional model data based on a plurality of pieces of image recording data captured from the same scene, and renders image display data based on the three-dimensional model data (see JP-A-2011-149952).

However, when generating a single piece of three-dimensional model data from a plurality of pieces of visible light image data obtained by capturing a scene from different image capture points, each image capture point will have a different illumination environment, errors, and so on. This can result in unnaturally noticeable borders between pieces of visible light image data appearing in the display image depending on the set point of view, leading to an undesirable display quality.

SUMMARY

An advantage of some aspects of the invention is to increase the display quality of an image based on a plurality of pieces of visible light image data and three-dimensional model data.

A three-dimensional image processing apparatus according to an aspect of the invention includes: an obtainment unit that obtains range image data expressing a depth of a scene as viewed from mutually different measurement points from each of a plurality of range image generation devices that generate the range image data, and obtains, from one or more visible light image generation devices that generate visible light image data of the scene as viewed from mutually different image capture points, a plurality of pieces of the visible light image data; a model generation unit that generates three-dimensional model data expressing a target contained in the scene based on the plurality of pieces of range image data; a setting unit that sets a point of view for the scene; and a rendering unit that renders display image data expressing the scene as viewed from the set point of view based on the three-dimensional model data and the plurality of pieces of visible light image data having mutually different image capture points. Here, in the case where there are a plurality of pieces of visible light image data corresponding to a region on a surface of the target expressed by the three-dimensional model data, the rendering unit selects one of the pieces of the visible light image data in accordance with the set point of view and renders the region corresponding to the surface of the target based on the selected visible light image data and the three-dimensional model data.

Here, the scene is a space that contains the target captured in the range image data and the visible light image data, as well as a background of the target. The point of view is a so-called virtual point of view set assuming that an image displayed based on the display image data is an image from the perspective of a person, a camera, or the like. Accordingly, the point of view has a position corresponding to the position of an eye, a lens, or the like and a direction corresponding to a line of sight, an optical axis of the lens, or the like. In other words, the point of view has a position and a direction. According to this aspect of the invention, the visible light image data that serves as the basis for rendering the display image data is selected on a region-by-region basis in accordance with the set point of view, and thus borders between the visible light image data appearing in the display image data can be changed in accordance with the set point of view. For example, if only one piece of the visible light image data is selected as a basis for rendering a central area of the display image data so that borders between the visible light image data do not appear in the central area, the display quality of the image based on the three-dimensional model data can be improved. In other words, a range of the target that appears in the display image data is defined by defining the point of view, and if the range of the target appearing in the display image data is defined, the area of the visible light image data corresponding to that defined range is also defined. In the case where there are a plurality of pieces of visible light image data corresponding to a specific range of the display image data, the visible light image data can be selected so as to improve the image quality of the display. As a result, the display quality of the image based on the three-dimensional model data can be improved.

The functions of the various units described in the claims are realized as hardware resources whose functions are specified by the structures of the units, hardware resources whose functions are specified by programs, or as a combination of the two. In addition, the functions of these units are not intended to be limited to being realized by hardware resources that are physically independent from each other. Furthermore, the invention can also be realized as a method invention, a three-dimensional image processing system invention that combines a range image generation device and a visible light image generation device, a three-dimensional image processing program invention, and an invention for a recording medium thereof. Of course, the recording medium for this computer program may be a magnetic recording medium, a magneto-optical recording medium, or any other type of recording medium that will be developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described hereinafter according to the following order with reference to the appended drawings. Note that in the drawings, like constituent elements are given the same reference numerals, and redundant descriptions thereof are omitted.

1. CONFIGURATION

Figure 1:
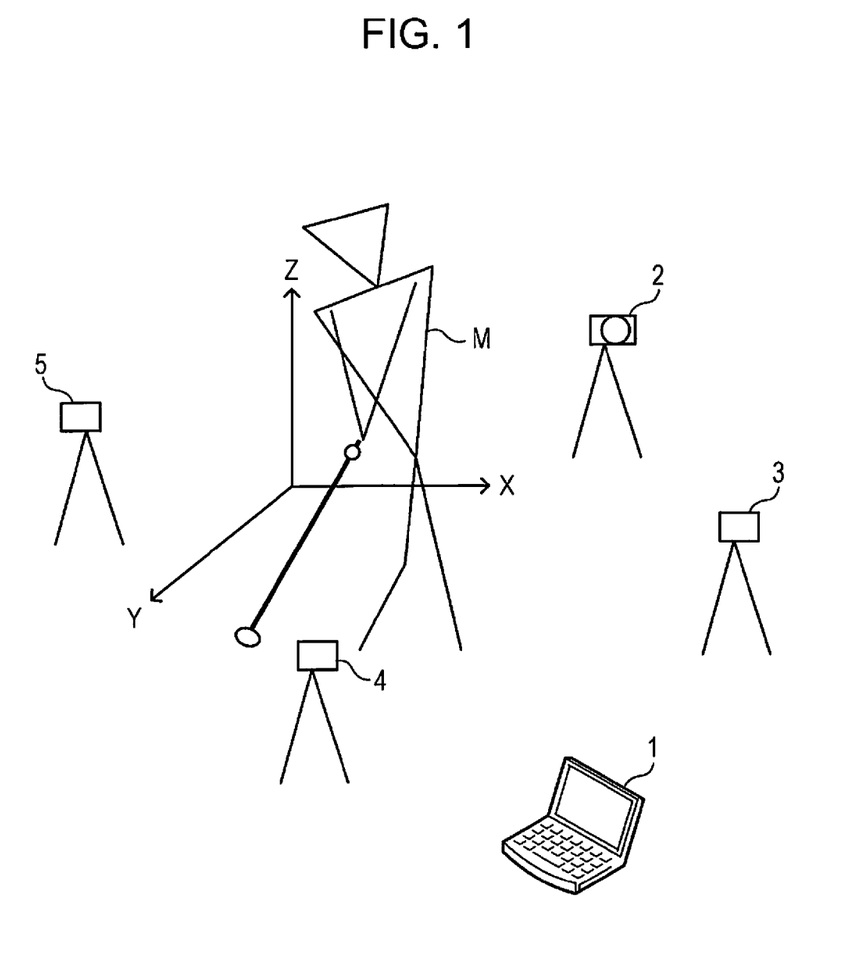
FIG. 1 is a schematic diagram illustrating a usage state of a three-dimensional image processing apparatus according to an embodiment of the invention.

A three-dimensional image processing system that records and displays a moving picture of a person's golf swing for use in coaching that person's golf swing will be described as an embodiment of the invention. A three-dimensional image processing apparatus 1 illustrated in FIG. 1 is a PC (personal computer) configured to be capable of obtaining range image data and visible light image data of a scene containing a target person M from image capturing units 2, 3, 4, and 5 and displaying, based on the obtained range image data and visible light image data, an image of the person M from a point of view set in the scene.

The image capturing units 2, 3, 4, and 5 are disposed at, for example, 90-degree intervals so as to cancel out each others' blind spots with respect to the person M that is the target for the recording of movement, or in other words, so as to surround the person M. It is sufficient for two or more image capturing units to be provided, and three or five or more may be provided as well. The image capturing units 2, 3, 4, and 5 respectively include range image generation units 21, 31, 41, and 51 serving as range image generation devices, and visible light image generation units 22, 32, 42, and 52 serving as visible light image generation devices. Each of the range image generation units 21, 31, 41, and 51 includes a light source having a near-infrared LED and a near-infrared image sensor, and generates the range image data by measuring, in real time, an amount of time from when light emitted from the light source is reflected by the target and returns, for each pixel in the near-infrared image sensor. The range image data generated in this manner expresses distances from the range image generation units 21, 31, 41, and 51 to the target. In other words, the range image data generated by the range image generation units 21, 31, 41, and 51 expresses depths of the scene as viewed from mutually-different measurement points. Each of the visible light image generation units 22, 32, 42, and 52 includes a visible light image sensor, and generates the visible light image data by measuring the intensity of visible light on a pixel-by-pixel basis. For a single image capturing unit, the image capture point of the visible light image generation unit and the measurement point of the range image generation unit almost match (are separated by a distance, relative to the scale of the person M, that is small enough to be ignored), and an image capturing direction and a measurement direction match. Here, the image capture point of each of the visible light image generation units 22, 32, 42, and 52 is a point where the optical axis of an optical system that forms an image on the visible light image sensor intersects with the visible light image sensor. The image capturing direction of each of the visible light image generation units 22, 32, 42, and 52 is a direction in which the optical axis of the optical system that forms an image on the visible light image sensor extends from the image capturing unit. The measurement point of each of the range image generation units 21, 31, 41, and 51 is a point where the optical axis of an optical system that forms an image on the near-infrared image sensor intersects with the near-infrared image sensor. The measurement direction of each of the range image generation units 21, 31, 41, and 51 is a direction in which the optical axis of the optical system that forms an image on the near-infrared image sensor extends from the image capturing unit. A three-axis orthogonal coordinate system unique to each image capturing unit is defined by the image capture point, the image capturing direction, the measurement point, and the measurement direction. Each image capturing unit outputs each pixel of the visible light image data generated by the visible light image generation unit and each pixel of the range image data generated by the range image generation unit in association with each other, based on the measurement point and the measurement direction of the range image generation unit and the image capture point and the image capturing direction of the visible light image generation unit, which are known for each image capturing unit. For example, each image capturing unit may output the visible light image data and the range image data as separate data files, or may output a single data file having a total of four channels, three of which are RGB channels constituted by the visible light image data and one of which is constituted by the range image data, for each pixel.

Here, because the image capturing positions and the image capturing directions of the image capturing units 2, 3, 4, and 5 differ from each other, the same regions of the target are generally recorded in different colors. This is because different exposure correction amounts are used for different illumination light-image capturing direction relationships, for example. As such, in the case where the visible light image data is stitched together and the target is displayed in a screen, borders between the pieces of visible light image data will be visible on the screen, resulting in an unnatural image. The three-dimensional image processing apparatus 1 described hereinafter increases the display quality of an image based on a plurality of pieces of the visible light image data and three-dimensional model data.

Figure 2:
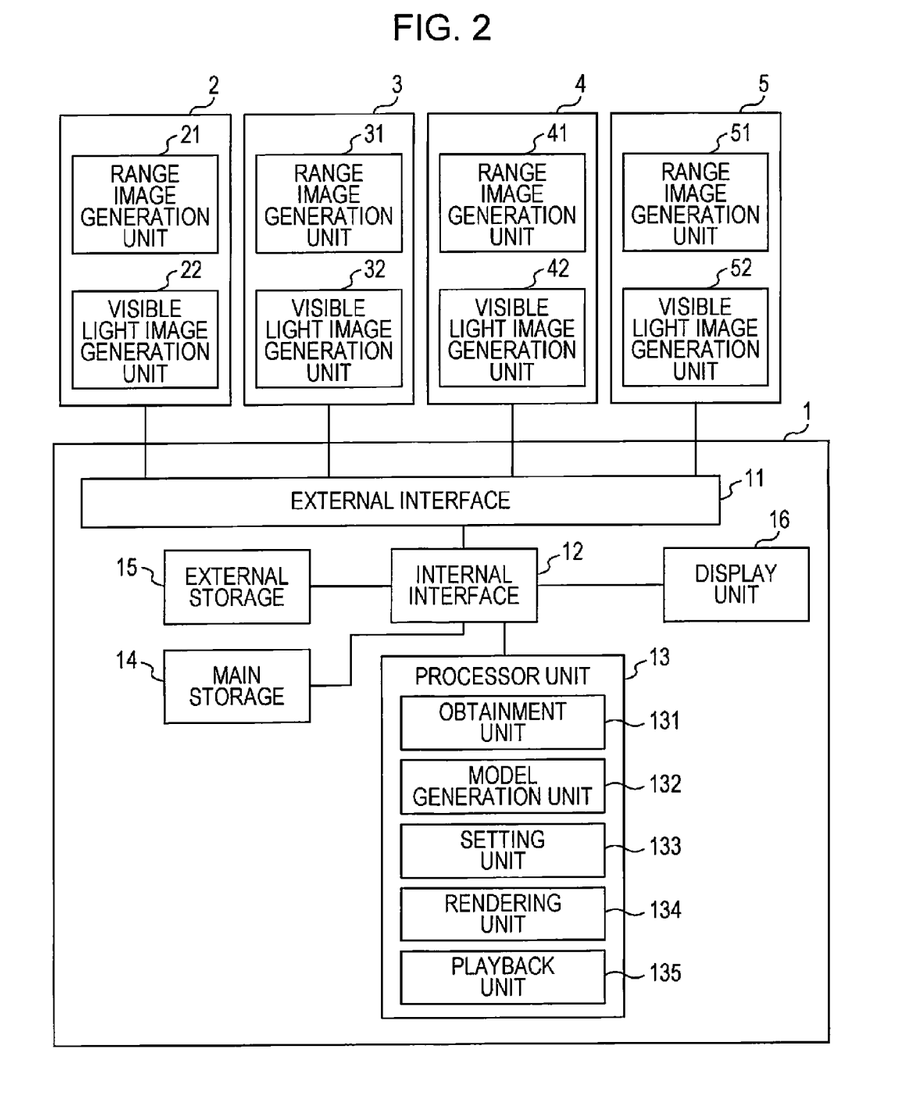
FIG. 2 is a block diagram illustrating a three-dimensional image processing apparatus according to an embodiment of the invention.

As illustrated in FIG. 2, the three-dimensional image processing apparatus 1 includes an external interface 11, an internal interface 12, a processor unit 13, a main storage unit 14, an external storage unit 15, a display unit 16, and so on. The external interface 11 includes an input/output interface based on a standard such as USB, LAN, Bluetooth, IrDA, or the like, and inputs the range image data and the visible light image data from the image capturing units 2, 3, 4, and 5. Note that the image capturing units 2, 3, 4, and 5 and the three-dimensional image processing apparatus 1 may or may not be communicably connected. In the case where the image capturing units 2, 3, 4, and 5 and the three-dimensional image processing apparatus 1 are not connected, the data may be inputted from the image capturing units 2, 3, 4, and 5 into the three-dimensional image processing apparatus 1 using a removable memory. Various types of programs such as an OS (Operating System), a three-dimensional image processing program, and so on are stored in the external storage unit 15. The display unit 16 includes a liquid-crystal display panel, a display controller, and so on. The internal interface 12 controls the transfer of data among the external interface 11, the external storage unit 15, the main storage unit 14, the display unit 16, and the processor unit 13.

By loading the three-dimensional image processing program stored in the external storage unit 15 into the main storage unit 14 and executing the program, the processor unit 13 functions as an obtainment unit 131, a model generation unit 132, a setting unit 133, a rendering unit 134, and a playback unit 135. As the obtainment unit 131, the processor unit 13 functions so as to obtain the range image data and the visible light image data from the image capturing units 2, 3, 4, and 5. As the model generation unit 132, the processor unit 13 functions so as to generate the three-dimensional model data based on a plurality of pieces of the range image data having mutually-different measurement points. As the setting unit 133, the processor unit 13 functions so as to set a point of view for the target. As the rendering unit 134, the processor unit 13 functions so as to render display image data expressing the target as seen from the set point of view based on the generated three-dimensional model data and the plurality of pieces of the visible light image data having mutually-different image capture points. As the playback unit 135, the processor unit 13 functions so as to display the target in a screen of the display unit 16 based on the display image data. These functions will be described in detail hereinafter.

2. THREE-DIMENSIONAL IMAGE PROCESSING METHOD

Figure 3:
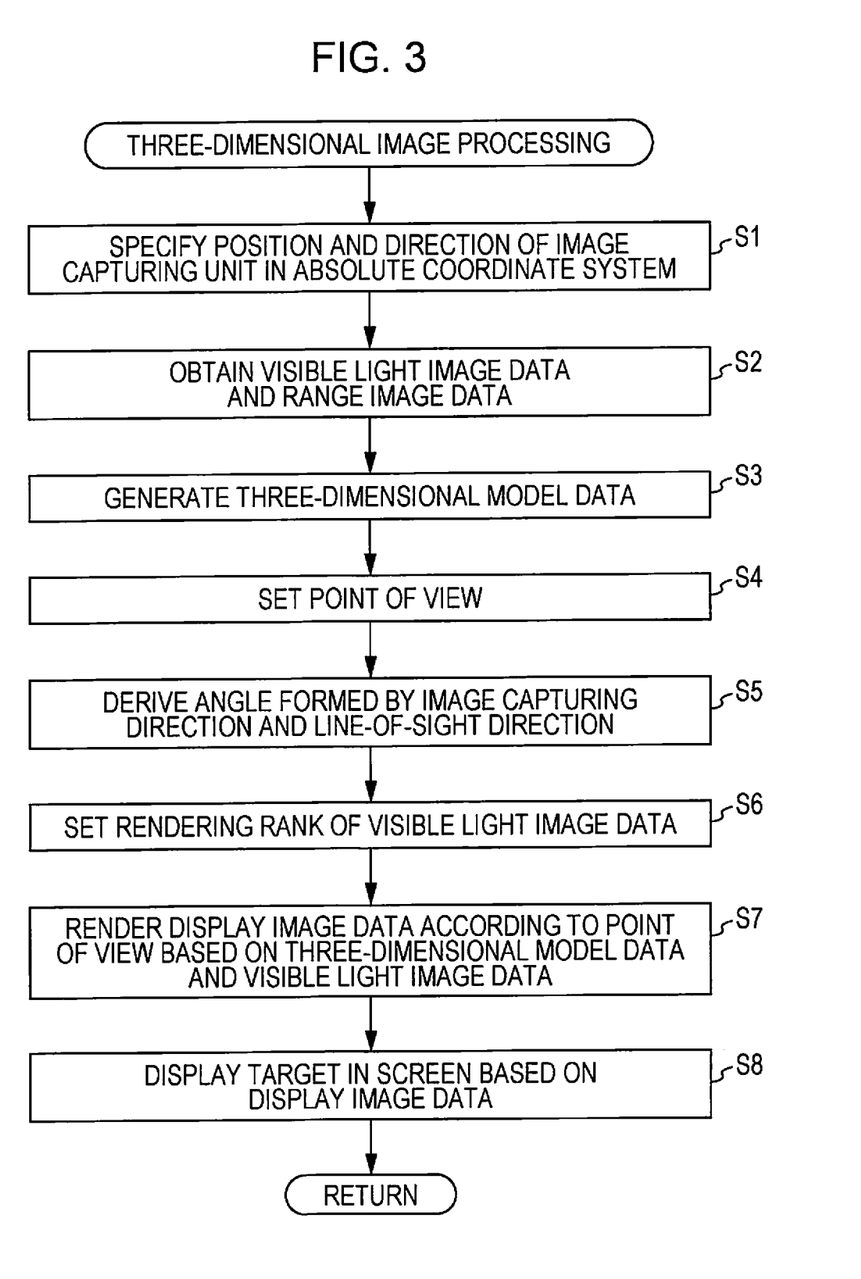
FIG. 3 is a flowchart illustrating three-dimensional image processing according to an embodiment of the invention.

FIG. 3 is a flowchart illustrating the flow of a three-dimensional image processing method that uses the three-dimensional image processing apparatus 1. Operations performed by the three-dimensional image processing apparatus 1 will be described hereinafter with reference to FIG. 3.

Figure 4:
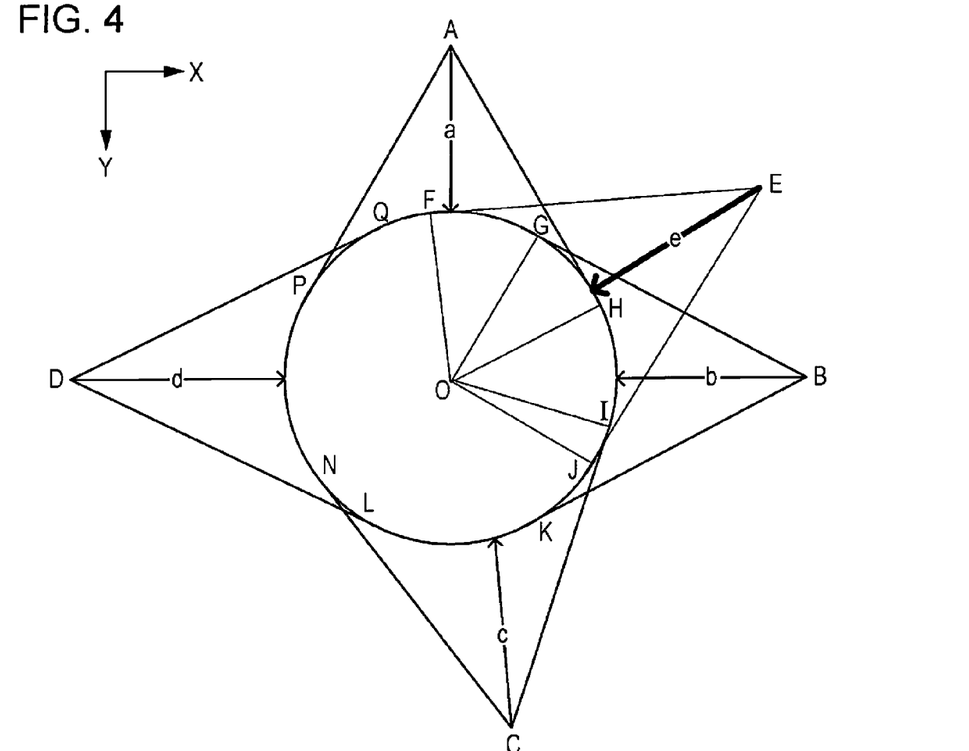
FIG. 4 is a diagram illustrating an image capture range according to an embodiment of the invention.
Figure 5:
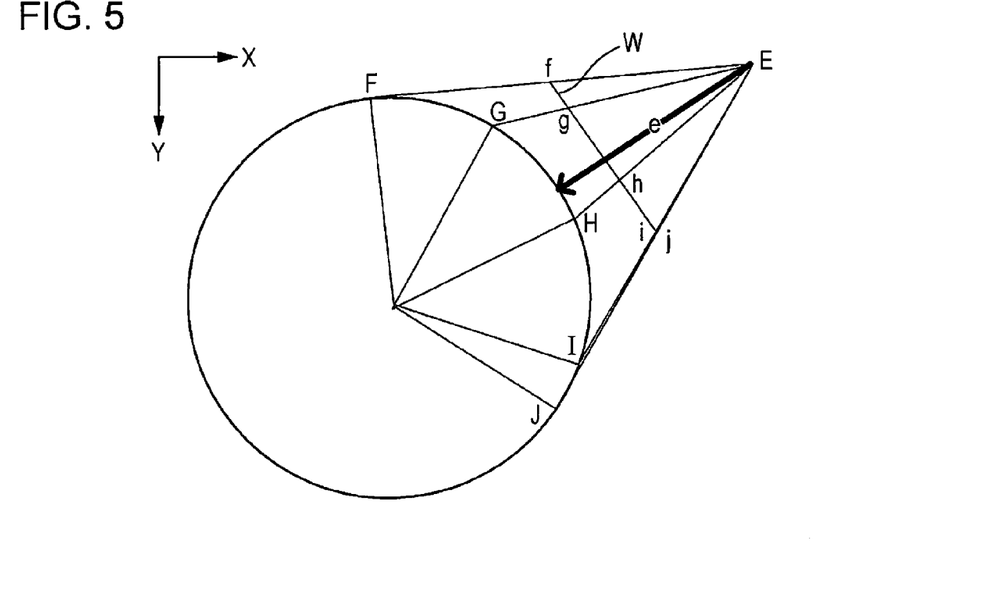
FIG. 5 is a diagram illustrating a correspondence relationship between a display coordinate system and an absolute coordinate system according to an embodiment of the invention.

First, the processor unit 13 specifies positions and directions (orientations) of the image capturing units 2, 3, 4, and 5 using an absolute coordinate system (S1). Here, the absolute coordinate system is a three-axis orthogonal coordinate system independent from the individual coordinate systems of the image capturing units 2, 3, 4, and 5. In FIGS. 1, 4, and 5, the three axes of the absolute coordinate system are indicated as an X axis, a Y axis, and a Z axis. This absolute coordinate system is used in order to associate a coordinate system of the display image data for displaying in the screen an image of the person M, serving as the target, as seen from a given point of view, with the coordinate systems of the image capturing units 2, 3, 4, and 5. If the precise positional relationships and directions of each of the image capturing units 2, 3, 4, and 5 are known, defining an appropriate origin makes it possible to define the positions and directions of the image capturing units 2, 3, 4, and 5 in the absolute coordinate system. In actuality, after, for example, setting up the image capturing units 2, 3, 4, and 5 at generally predetermined positions and generally predetermined orientations around a known target for the purpose of calibration, the positions and directions of the image capturing units 2, 3, 4, and 5, or in other words, the image capturing positions, image capturing directions, measurement positions, and measurement directions thereof, are derived by assuming that parts of the shape of the target derived based on the range image data generated by each image capturing unit express the same region of the target. Specifically, the actual position and direction of each image capturing unit may be mathematically specified in the absolute coordinate system using a pattern matching method such as ICP (iterative closest point), for example, based on the range image data generated by each image capturing unit. Once unit vectors indicating coordinates of the position and the direction of each image capturing unit are specified in the absolute coordinate system, a transformation matrix for converting the coordinate system unique to each image capturing unit into the absolute coordinate system can be derived. Because the positions and directions (orientations) of the image capturing units 2, 3, 4, and 5 are necessary in the rendering process carried out in step S8 (mentioned later), the transformation matrix for converting the coordinate systems of the image capturing units into the absolute coordinate system is derived after those positions and directions (orientations) have been derived in the absolute coordinate system.

Upon a user instructing a data input after the three-dimensional image processing program has been launched, the processor unit 13 obtains the range image data and the visible light image data from the image capturing units 2, 3, 4, and 5 (S2). For example, in the case where the three-dimensional image processing apparatus 1 and the image capturing units 2, 3, 4, and 5 are connected, the user can instruct the input of the data from the image capturing units 2, 3, 4, and 5 by operating a mouse and keyboard, a touch panel, or the like of the three-dimensional image processing apparatus 1.

Next, the processor unit 13 generates four pieces of three-dimensional model data based on the four pieces of range image data obtained from the image capturing units 2, 3, 4, and 5 (S3). Here, for example, the processor unit 13 generates, as three-dimensional model data in the absolute coordinate system, a polygonal model of the person M serving as the target, for each piece of range image data generated by the image capturing units 2, 3, 4, and 5. The processor unit 13 also generates associations between each polygon in the three-dimensional model data and the visible light image data, for each of the image capturing units. In other words, polygons and visible image data pixels that correspond to the same region of the person M are associated with each other. Specifically, each pixel in the visible light image data and each pixel in the range image data generated by the same image capturing unit are associated in advance by the image capturing unit, and thus based on this association, an association is generated between each polygon of the three-dimensional model data in the absolute coordinate system based on the range image data and each pixel of the visible light image data in the coordinate system of the image capturing unit corresponding to that range image data.

Next, the processor unit 13 sets a point of view for the scene (S4). In this embodiment, the position of a predetermined point on a sphere in the absolute coordinate system serves as the position of the point of view, and a direction moving toward the center of the sphere from the point of view on the sphere serves as a line-of-sight direction when the target is virtually viewed from the point of view. In step S8 (mentioned later), the point of view is set in a coordinate system of the display unit 16 through a scrolling operation in the screen in which the person M serving as the target is displayed. Specifically, for example, a scrolling operation amount in the screen may be associated in advance with a movement amount of the position of the point of view on the sphere defined in the absolute coordinate system, and the position of the point of view may be changed in accordance with the scrolling operation amount in the case where the screen is scrolled. When the position of the point of view is instructed by the user in this manner, the processor unit 13 sets absolute coordinates indicating the point of view position and a unit vector indicating the line-of-sight direction from the point of view.

Next, the processor unit 13 derives an angle formed by the image capturing direction and the line-of-sight direction for each image capturing unit (S5). Specifically, the angle formed by the image capturing direction and the line-of-sight direction is derived based on the unit vector of the image capturing direction of the image capturing unit as derived in step S1 and the unit vector of the line-of-sight direction as derived in step S4. Accordingly, in the case where a line perpendicular to the screen displayed in step S8 (mentioned later) is assumed to extend into the space of the scene, an angle between that perpendicular line and the image capturing direction is derived. Here, the line perpendicular to the screen displayed in step S8 can be treated as the direction of the line of sight of the user viewing the screen, and thus the angle formed by the image capturing direction and the line-of-sight direction for each image capturing unit corresponds to an angle formed by the direction from which the image capturing unit captures an image of the person M and a virtual line-of-sight direction of the user viewing the person M through the screen.

Next, the processor unit 13 sets a priority rank for rendering the visible light image data based on the angles formed by the image capturing directions and the line-of-sight directions (S6). Specifically, a higher priority rank is set in order from the smallest angle between the image capturing direction (that is, the center of an angle of view of the image capturing unit) and line-of-sight direction so that the visible light image data generated by the visible light image generation unit having the smallest angle between the image capturing direction and the line-of-sight direction is rendered with priority.

FIG. 4 is a diagram schematically illustrating the target captured by the image capturing units 2, 3, 4, and 5. In FIG. 4, a circle whose center is indicated by O expresses a horizontal cross-section of a cylinder serving as the target, points A, B, C, and D express the image capture points of the image capturing units 2, 3, 4, and 5, respectively, arrows a, b, c, and d express the image capturing directions, a point E expresses the point of view position, and an arrow e expresses the line-of-sight direction. Points G, H, I, K, L, N, P, and Q express contours of the cylinder O captured by the image capturing units 2, 3, 4, and 5. In other words, it is assumed that an angle of view of the cylinder O appearing in the visible light image data captured by the image capturing unit 2 from the direction a is ∠PAH. Accordingly, a side surface region of the cylinder O corresponding to PQFGH is recorded in the visible light image data, and a side surface region of the cylinder O corresponding to PNLKJIH is a blind spot. Meanwhile, it is assumed that an angle of view of the cylinder O appearing in the visible light image data captured by the image capturing unit 3 from the direction b is ∠GBK. Accordingly, a side surface region of the cylinder O corresponding to GHIJK is recorded in the visible light image data, and a side surface region of the cylinder O corresponding to GFQPNLK is a blind spot. In addition, it is assumed that an angle of view of the cylinder O appearing in the visible light image data captured by the image capturing unit 4 from the direction c is ∠ICN. Accordingly, a side surface region of the cylinder O corresponding to IJKLN is recorded in the visible light image data, and a side surface region of the cylinder O corresponding to NPQFGHIJ is a blind spot. The same applies to the image capturing unit 5. The point of view is set to E, and it is assumed that the angle of view of the cylinder displayed in step S8 is ∠FEJ.

Assuming this, of the angles formed by the line-of-sight direction e and the image capturing directions a, b, c and d, the image capturing direction b is lowest and the image capturing direction d is highest, and arranging the angles in order from the smallest angle results in b, a, c, and d. Accordingly, the preferential rank in which the visible light image data is the image capturing unit 3, the image capturing unit 2, the image capturing unit 4, and the image capturing unit 5.

Next, based on the three-dimensional model data and the visible light image data associated with each other, the processor unit 13 renders the display image data for displaying the person M serving as the target in the screen of the display unit 16 from the point of view (S7). Here, a storage region in the main storage unit 14 corresponding to a screen region in which an image is displayed based on the display image data is called a rendering region. The rendering region is a region in which the display image data is generated, and is a storage region in which an address corresponding to each pixel in the screen of the display unit 16 is defined. Each storage region corresponding to a pixel in the screen is called a pixel address. A coordinate system expressing the positions of the pixels in the screen corresponding to the pixel addresses is called a display coordinate system. The pixel addresses correspond one-to-one to coordinates in the display coordinate system. The correspondence relationship between the display coordinate system and the absolute coordinate system corresponds to positions and orientations in the absolute coordinate system of a virtual window W through which the scene is viewed from the point of view, as illustrated in FIG. 5. In other words, the window W corresponds to the rendering region itself, is perpendicular to the direction of the point of view, and the area thereof is determined by an angle of view. The angles of view of the visible light image generation units 22, 32, 42, and 52 are predetermined, and thus the window W is defined in accordance with the position and direction of the point of view. In other words, because the position and direction of the point of view is defined in the absolute coordinate system in step S4, the processor unit 13 can derive a transformation matrix for converting from the absolute coordinate system to the display coordinate system based on the position and direction of the point of view. Then, in step S3 mentioned above, a correspondence relationship is defined between the visible light image data and the three-dimensional model data, and the three-dimensional model data is generated in the absolute coordinate system. In other words, each pixel in the visible light image data is associated with coordinates in the absolute coordinate system through the corresponding three-dimensional model data. Accordingly, based on the correspondence relationship between the coordinate systems of the image capturing units 2, 3, 4, and 5 and the absolute coordinate system derived in step S1 and the position and direction of the point of view, the processor unit 13 can convert the coordinates of each pixel in the visible light image data from the coordinate system of the visible light image data to the display coordinate system through the absolute coordinate system.

Accordingly, the processor unit 13 writes the value of each pixel in all of the visible light image data into the corresponding pixel addresses in the rendering region, in order from the lowest rendering priority rank. This means that in a pixel address corresponding to two or more visible light image data pixels, the value of a pixel in the visible light image data having a higher rendering priority rank is written after the value of the pixel in the visible light image data having a low rendering priority rank is written. As a result, for each pixel address, the value of the visible light image data having the highest rendering priority rank is ultimately written into each pixel address of the rendering region. In other words, the processor unit 13 ultimately selects the visible light image data having the highest rendering priority rank among the four pieces of visible light image data in accordance with the point of view, and renders the display image data based on the selected visible light image data and the three-dimensional model data corresponding to the selected visible light image data.

For example, in the case where the cylinder O has been captured in the state illustrated in FIG. 4, the visible light image data generated by the image capturing unit 3 is written into a region gh of the window W illustrated in FIG. 5 corresponding to a side surface region GH of the cylinder O, or in other words, into a pixel address region gh, after the visible light image data generated by the image capturing unit 2 is written. Likewise, the visible light image data generated by the image capturing unit 5 is written into a pixel address region ij illustrated in FIG. 5 corresponding to a side surface region IJ of the cylinder O after the visible light image data generated by the image capturing unit 4 is written. Only the visible light image data generated by the image capturing unit 3 is written into a pixel address region hi illustrated in FIG. 5 corresponding to a side surface region HI of the cylinder O. As a result, a side surface region FG of the cylinder O is rendered using the visible light image data from the image capturing unit 2, and a side surface region GHIJ of the cylinder O is rendered using the visible light image data from the image capturing unit 3.

Next, the processor unit 13 displays the person M serving as the target in the screen of the display unit 16 based on the display image data (S8). The processor unit 13 may display an image based on the display image data in a screen region having a smaller number of pixels than the number of pixels in the display image data, or may display an image based on the display image data in a screen region having a greater number of pixels than the number of pixels in the display image data. In this embodiment, display image data having a higher resolution than the screen region for display is generated in step S7, and the region of the display image data to be actually displayed in the screen can then be specified by the user.

Figure 6A:
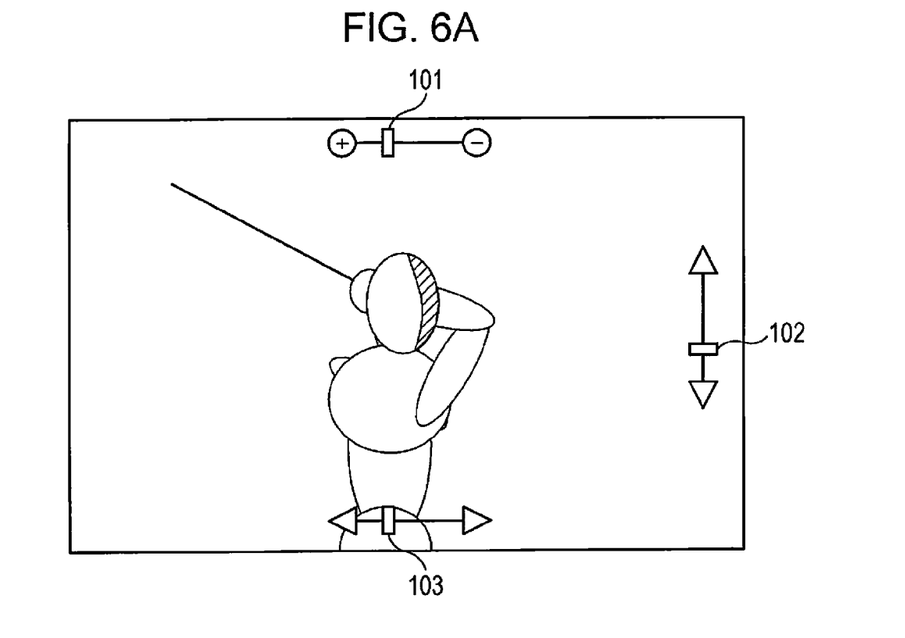
FIGS. 6A and 6B are diagrams illustrating screen configurations in a three-dimensional image processing apparatus according to an embodiment of the invention.
Figure 6B:
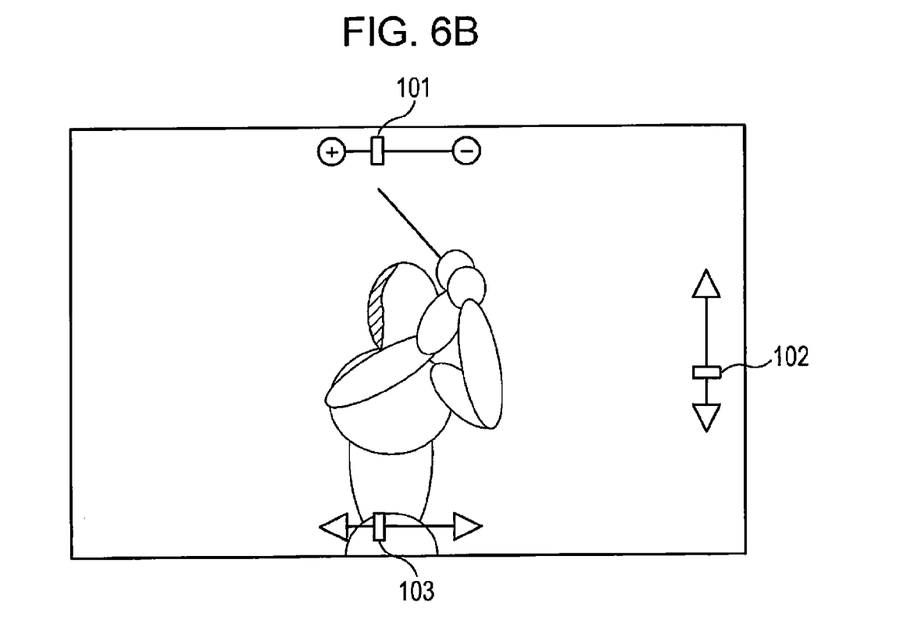

FIGS. 6A and 6B illustrate examples of screens in the display unit 16 in which the person M is displayed by the processor unit 13 based on the display data. The processor unit 13 displays a slider 101 in the screen for specifying a display scale, and the size of the region of the display image data displayed in the screen is changed based on an amount by which the slider 101 is operated. Through this, a specific part of the person M can be displayed in an enlarged manner, as if the point of view is being brought closer to the person M, or the entire person M can be displayed as if the point of view is being distanced from the person M. In addition, for example, display image data having a higher resolution than the screen region to be displayed is generated in step S7, sliders 102 and 103 for moving the display region horizontally are displayed in the screen, and the position of the region of the display image data displayed in the screen is moved horizontally based on amounts by which the sliders are operated. Through this, the display region can be changed as if the point of view is being moved in a direction perpendicular to the line-of-sight direction. In this manner, even if the setting region for the point of view is limited to the surface of the sphere in step S4, the same display effect as when moving the point of view closer to the center of the sphere and further from the center of the sphere can be achieved.

Meanwhile, for example, an amount of a dragging operation made in a region aside from the sliders 101, 102, and 103 may be associated with a predetermined movement amount of the point of view on the surface of the sphere as a method for accepting operations for changing the setting of the point of view in the screens illustrated in FIGS. 6A and 6B.

Here, assume that a region of a head area of the person M that is hatched in FIGS. 6A and 6B has been captured by two image capturing units 2 and 3, the line-of-sight direction set in the screen illustrated in FIG. 6A is almost parallel to the image capturing direction of the image capturing unit 3, and the line-of-sight direction set in the screen illustrated in FIG. 6B is almost parallel to the image capturing direction of the image capturing unit 2. If it is assumed that a relationship between the hatched region and the visible light image data is fixed, a border of the hatching in either of FIG. 6A and FIG. 6B will have a marked difference between a color displayed based on the visible light image data generated by the image capturing unit 2 and the color displayed based on the visible light image data generated by the image capturing unit 3. Furthermore, if it is assumed that a relationship between the hatched region and the three-dimensional model data is fixed, calibration error, measurement error, and so on in the range image generation units 21, 31, 41, and 51 will emphasize unevenness that is actually not present in regions where the hatching border in either FIG. 6A or FIG. 6B and contours of the person M intersect.

As opposed to this, according to the embodiment of the invention as described thus far, a region corresponding to the hatching indicated in FIG. 6A and a side of the head area on the left thereof are displayed based on the visible light image data generated by the image capturing unit 3. Accordingly, there is no difference in the display colors of the two pieces of visible light image data at the border of the hatching indicated in FIG. 6A. In addition, a region corresponding to the hatching indicated in FIG. 6B and a side of the head area on the right thereof are displayed based on the visible light image data generated by the image capturing unit 2. Accordingly, there is no difference in the display colors of the two pieces of visible light image data at the border of the hatching indicated in FIG. 6B as well. In other words, the visible light image data that serves as the data for displaying the hatched region switches depending on the point of view, and thus no difference appears between the display colors of the two pieces of visible light image data at the border of the hatched region. A region corresponding to the hatching indicated in FIG. 6A and a side of the head area on the left thereof are displayed on the basis of the three-dimensional model that is based on the range image data generated by the image capturing unit 3. Meanwhile, a region corresponding to the hatching indicated in FIG. 6B and a side of the head area on the right thereof are displayed on the basis of the three-dimensional model that is based on the range image data generated by the image capturing unit 2. Accordingly, unevenness that is not actually present does not appear in a region where the border of the hatching and a contour of the person M intersect, in either of the screens illustrated in FIG. 6A and FIG. 6B. In other words, according to this embodiment, the quality of an image displayed in accordance with a point of view based on the plurality of pieces of visible light image data and the three-dimensional model data can be improved.

3. OTHER EMBODIMENTS

Note that the technical scope of the invention is not intended to be limited to the aforementioned embodiments, and it goes without saying that various changes can be added within a scope that does not depart from the essential spirit of the invention. For example, the range image generation device may be any device capable of generating range image data expressing the depth of the scene as viewed from a measurement point, and may employ a technique that projects light in a striped pattern onto the target and generates the range image data from how the straight-line stripes deform on the surface of the target (a structured light technique). The image sensors of the range image generation device and the visible light image generation device may be integrated as well. For example, the visible light image data and the range image data may be generated based on the output of an image sensor having, for example, a wide photosensitive wavelength range that enables images to be captured from visible light to infrared light.

In addition, although the aforementioned embodiment describes generating three-dimensional model data corresponding to each piece of visible light image data and switching the three-dimensional model data in accordance with the point of view, three pieces of model data may be integrated in order to generate a single piece of three-dimensional model data after the three-dimensional model data has been generated corresponding to each piece of visible light image data, and the display image data may then be rendered based on the single integrated piece of three-dimensional model data regardless of the point of view. In this case, for example, pixels of one or more pieces of the four pieces of visible light image data are associated with each polygon in a single piece of three-dimensional model data. In other words, depending on the polygon, the pixels from two or more pieces of the visible light image data are associated therewith. Accordingly, one of the two or more pieces of visible light image data may be selected in accordance with the point of view, and the display image data may then be rendered based on the selected visible light image data and the integrated three-dimensional model data.

Meanwhile, the model shape of the three-dimensional model data may be a shape using voxels, a shape using polygons, or a shape using free-form surfaces, and the polygons may be triangular polygons, quadrangular polygons, or polygons having even more sides.

In addition, although the aforementioned embodiment describes setting the point of view on the surface of a predetermined sphere in the absolute coordinate system, the configuration may be such that the point of view can be set at any desired position in the absolute coordinate system. Furthermore, although the aforementioned embodiment describes an example in which the direction of the point of view is determined in accordance with the position of the point of view, the configuration may be such that the position and direction of the point of view can be set independently.

In addition, although the aforementioned embodiment describes an example in which the visible light image data having the highest priority rank is ultimately selected and rendered as a result of setting priority ranks for the visible light image data and rendering that data starting with the data having the lowest priority rank, an algorithm may be employed to select the visible light image data instead of using a priority rank. For example, the angle formed by the image capturing direction and line-of-sight direction in each piece of visible light image data may be found in order, the angles that have been found may be compared to each other in order, the visible light image data having the smallest of the found angles may be selected, and the display image data may then be rendered using only the selected visible light image data.

In addition, although the aforementioned embodiment describes an example in which the visible light image data is selected in accordance with the angles formed by the image capturing direction and line-of-sight direction in each piece of visible light image data, the visible light image data may be selected in accordance with a distance between the point of view and the image capture point in the absolute coordinate system, selected in accordance with a distance between the point of view and the image capture point in the display coordinate system, and so on.

In addition, although the aforementioned embodiment describes selecting the visible light image data in each rendering region in units of the visible light image data, the visible light image data may be selected in units of pixels. To be more specific, an angle formed between a direction of a line connecting a point on the surface of the target corresponding to a pixel of interest and the image capture point, and the line-of-sight direction or the direction of the line connecting the point of view and the point on the surface of the target corresponding to the pixel of interest, may be derived for each image capture point, the visible light image data corresponding to the image capture point having the smallest angle derived in this manner may be selected, and the display image data may then be rendered.

In addition, although the aforementioned embodiment describes a person's golf swing as the display target, it goes without saying that the display target may be any scene, and a living thing aside from a person may be used as the display target, an object aside from a living thing (a structure such as a house or the like, for example) may be used as the display target, and so on.

In addition, in the aforementioned embodiment, the display image data is rendered based on a single piece of the visible light image data for each rendering region, and thus differences arise in the colors expressed by the respective pieces of visible light image data at borders between adjacent regions of different pieces of visible light image data that serve as the sources; however, for pixels near such adjacent region borders, the display image data may be rendered by synthesizing a plurality of pieces of the visible light image data, such as rendering the display image data with weighting added values for the values of pixels corresponding between two pieces of visible light image data, for example.

What is claimed is:

1. A three-dimensional image processing apparatus comprising:
    a processor that obtains, from each of a plurality of visible light image sensors having mutually different image capture points, visible light image data of the scene as viewed from the image capture point;
    the processor generating three-dimensional model data expressing a target contained in the scene;
    the processor setting a point of view for the scene; and
    the processor rendering display image data expressing the scene as viewed from the set point of view based on the three-dimensional model data and the plurality of pieces of visible light image data having mutually different image capture points,
    wherein in the case where there are a plurality of pieces of visible light image data corresponding to a region on a surface of the target expressed by the three-dimensional model data, the processor selects one of the pieces of the visible light image data in accordance with the set point of view and renders the region corresponding to the surface of the target based on the selected visible light image data and the three-dimensional model data, wherein the processor selects one of the pieces of the visible light image data in accordance with a positional relationship between the point of view and the image capture point, and wherein the processor selects one of the pieces of the visible light image data in accordance with the magnitude of angles formed between an image capturing direction of each visible light image sensor and a direction of the set point of view.

2. The three-dimensional image processing apparatus according to claim 1, wherein in border areas among a plurality of the stated regions, the processor renders the display image data by synthesizing a plurality of the pieces of the visible light image data corresponding to those border areas.

3. The three-dimensional image processing apparatus according to claim 1, wherein the processor obtains, from each of a plurality of range image sensors having mutually different measurement points, range image data expressing a depth of a scene viewed from the measurement point.

4. The three-dimensional image processing apparatus according to claim 3, wherein the processor generates the three-dimensional model data for each measurement point; and the processor selects one of the pieces of the three-dimensional model data and one of the pieces of the visible light image data in accordance with the set point of view and renders the display image data based on the selected three-dimensional model data and the selected visible light image data.

5. A three-dimensional image processing system comprising:

a plurality of visible light image sensors having mutually different image capture points; and a three-dimensional image processing apparatus, wherein the three-dimensional image processing apparatus includes:

a processor that obtains visible light image data of the scene as viewed from the image capture points from the plurality of visible light image sensors;

the processor generating three-dimensional model data expressing a target contained in the scene;

the processor setting a point of view for the scene; and the processor rendering display image data expressing the scene as viewed from the set point of view based on the three-dimensional model data and the plurality of pieces of visible light image data having mutually different image capture points, and wherein in the case where there are a plurality of pieces of visible light image data corresponding to a region on a surface of the target expressed by the three-dimensional model data, the processor selects one of the pieces of the visible light image data in accordance with the set point of view and renders the region corresponding to the surface of the target based on the selected visible light image data and the three-dimensional model data, wherein the processor selects one of the pieces of the visible light image data in accordance with a positional relationship between the point of view and the image capture point, and wherein the processor selects one of the pieces of the visible light image data in accordance with the magnitude of angles formed between an image capturing direction of each visible light image sensor and a direction of the set point of view.

6. The three-dimensional image processing system according to claim 5, further comprising:

a plurality of range image sensors having mutually different measurement points, the processor obtaining range image data expressing a depth of a scene viewed from the measurement points of the plurality of range image sensors from the plurality of range image sensors.

7. A three-dimensional image processing method comprising:

obtaining, from each of a plurality of visible light image sensors having mutually different image capture points, visible light image data of the scene as viewed from the image capture point;

generating three-dimensional model data expressing a target contained in the scene;

setting a point of view for the scene; and rendering display image data expressing the scene as viewed from the set point of view based on the three-dimensional model data and the plurality of pieces of visible light image data having mutually different image capture points, wherein in the case where there are a plurality of pieces of visible light image data corresponding to a region on a surface of the target expressed by the three-dimensional model data, one of the pieces of the visible light image data is selected in accordance with the set point of view and the region corresponding to the surface of the target is rendered based on the selected visible light image data and the three-dimensional model data, wherein one of the pieces of the visible light image data is selected in accordance with a positional relationship between the point of view and the image capture point, and wherein one of the pieces of the visible light image data is selected in accordance with the magnitude of angles formed between an image capturing direction of each visible light image sensor and a direction of the set point of view.

8. The three-dimensional image processing method according to claim 7, further comprising:

obtaining, from each of a plurality of range image sensors having mutually different measurement points, range image data expressing a depth of a scene viewed from the measurement point.

* * * * *